No. 12,153. REISSUED SEPT. 8, 1903.

J. A. SCOTT.

PAPER BOX.

APPLICATION FILED SEPT. 12, 1902.

Witnesses:
Walter E. Lombard
A. W. Harrison

Inventor:
James A. Scott,
by Wright Brown & Quinby
his Attys.

No. 12,153. Reissued September 8, 1903.

UNITED STATES PATENT OFFICE.

JAMES A. SCOTT, OF SOMERVILLE, MASSACHUSETTS, ASSIGNOR OF ONE-HALF TO CHARLES E. FULLER, OF SOMERVILLE, MASSACHUSETTS.

PAPER BOX.

SPECIFICATION forming part of Reissued Letters Patent No. 12,153, dated September 8, 1903.

Original No. 686,146, dated November 5, 1901. Application for reissue filed September 12, 1902. Serial No. 123,190.

*To all whom it may concern:*

Be it known that I, JAMES A. SCOTT, of Somerville, in the county of Middlesex, State of Massachusetts, have made certain new and useful Improvements in Paper Boxes, of which the following is a full, clear, and exact description.

My invention pertains to that class of paper boxes in which the cover-section is constructed to telescope upon a slightly-contracted or neck section of the box proper. In these boxes as at present made it is customary to first construct the body portion of the box and then paste within it a slightly-smaller box or shell to constitute the neck. So made it is impossible to fold them flat for transportation or storage, and, moreover, the paste applied to confine the neck-section within the body-section tends to warp and bend the sides of the box, rendering them imperfect and unsightly in appearance.

The object of my invention is the construction of a neck-box of this character which shall be capable of folding, which shall not require the objectionable paste, shall be much cheaper than the old-style box, and, in addition, stronger and more sightly.

To this end my invention comprises two telescopic sections having each one or more flaps so combined as to form a firm bottom, the parts whereof mutually act to secure the inner or neck section from being withdrawn from the body-section.

Figure 1:
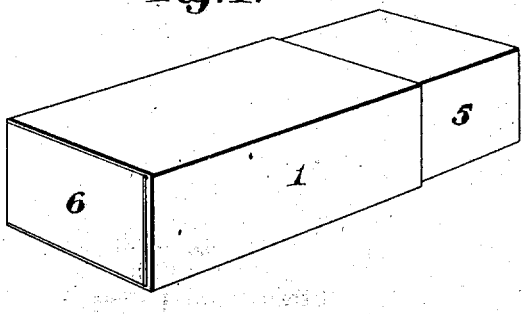
Figure 2:
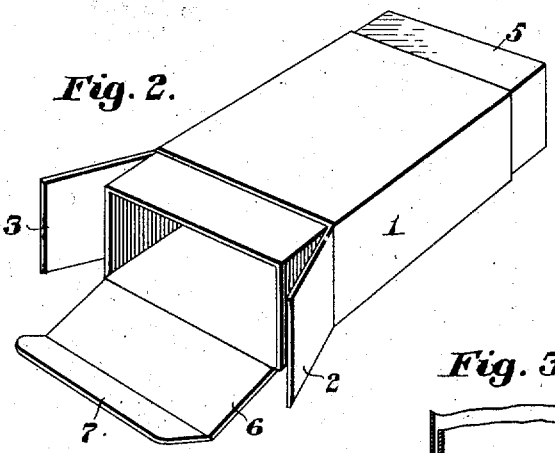
Figure 3:
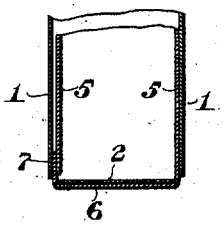

Referring to the drawings forming part of this specification, Figure 1 is a perspective view of my box complete and ready for use, but without cover. Fig. 2 is a perspective view of the same, but with the flaps unengaged and the two sections telescopically shifted relative to each other; and Fig. 3 is a vertical section of the lower portion of the box.

As is shown more clearly in Fig. 2, the box proper consists of the outer section 1, having the two oppositely-located flaps 2 and 3. The neck-section 5 is sufficiently smaller to fit within the box-section 1 and is enough longer to form the desired neck at the open end of the box. At the lower end of this neck-section is a bottom flap 6, having a locking-flap 7.

As illustrated in Fig. 2, the box is in a condition to be folded flat for transportation, inasmuch as said flaps are in substantially the same planes as the sides, of which they are continuations. To put the box into condition for use, the lower edges of the inner and outer sections are made flush with each other, or substantially so, and then the flaps 2 and 3 are folded inward against three of the edges of the section 5. The flap 6 is now brought up against said flaps 2 and 3 and its locking-flap 7 thrust in between the proximate edges of the inner and outer sections, as shown in Fig. 3. Thus located, the said locking-flap is wholly concealed both on the interior and exterior of the box and is prevented from accidental dislocation by the frictional engagement of the side walls of the bottom and neck sections therewith. Moreover, since the flap 6 is exterior to the flaps 2 and 3 the neck-section 5 cannot be withdrawn from within the body-section, and the flaps 2 and 3, being below certain of the edges of the neck-section, the latter cannot be pushed down and out from the body-section. It will therefore be found that the bottom of this box is composed of parts so combined and the flaps on the sections so interposed or interlocked by placing the flaps on the neck exteriorly of the flaps of the outer section and securing the end of said flaps that the sections cannot be separated from each other except by first removing the locking-flap 7 from its place and unfolding the remaining flaps. Hence no paste is required for binding the sections together, and consequently there will be no unsightly warping of the sides of the box.

I find from actual experience that this box is much more inexpensive than the old style of neck-box, while being stronger and better in other respects. It requires to have no labels pasted upon its sides, inasmuch as the desired matter can be printed directly thereon, either upon the blanks before being brought together into box form or upon the same when completed but folded flat.

My invention is applied principally to boxes designed for shoe-dressings, patent medicines, and bottled goods in general, but can be used for many other purposes. The top or edge of the neck can be cut slanting or into any fancy shape without materially adding to the cost of production, the same being cut and scored at the one operation, which is not possible in the old-style box.

What I claim as my invention, and for which I desire Letters Patent, is as follows, to wit:

1. A shoulder or neck box comprising two sections one slidable within the other, each having four sides, and the inner section being longer than the outer and projecting therefrom to constitute a neck for the reception of a suitable cover, and a flap formed on the lower end of one of said sections and closing the end of said box, said flap having its end inserted between the adjacent side walls of said inner and outer sections.

2. A shoulder or neck box comprising two sections one slidable within the other, each having four sides, and the inner section being longer than the outer and projecting therefrom to constitute a neck for the reception of a suitable cover, oppositely-projecting overlaping flaps closing the lower end of said box, and a third flap folded across and exteriorly of said oppositely-projecting flap, and having its end inserted between the adjacent side walls of said inner and outer sections, whereby said flaps when overlapped and folded as described, hold the said box in rigid form, and permit the flattening or collapsing of said box when unfolded.

3. In a shoulder or neck box, the combination of the outer four-sided section having the two opposite flaps at its lower end; and the inner or neck section having four sides all longer than the sides of the outer section and projecting from the upper end thereof to constitute a neck for the telescopic reception of a suitable cover; said inner section having the bottom flap provided with the locking-flap at its free edge; whereby the flaps of the outer section being folded inward toward each other, and the bottom flap being brought up external to said flaps, and secured in place by its said locking-flap, said sections are rigidly fastened together and a neck-box composed thereby, while a releasing of said flaps permits of the box being folded flat, substantially as described.

4. A shoulder or neck box comprising two telescopically-united sections each having four sides, and the inner section longer than the outer and projecting therefrom at the upper end to constitute a neck for the reception of a suitable cover; said inner and said outer sections being provided at their lower ends with interfolded and interlocking flaps forming a closed bottom; whereby a foldable neck-box is produced, substantially as described.

In testimony that I claim the foregoing invention I have hereunto set my hand this 4th day of September, 1902.

JAMES A. SCOTT.

Witnesses:
A. W. HARRISON,
ADELINE C. RATIGAN.